United States Patent [19]

Zehnpfennig et al.

[11] 4,429,953

[45] Feb. 7, 1984

[54] CURVED GLASS REFLECTOR AND METHOD OF MAKING SAME

[75] Inventors: Theodore F. Zehnpfennig, Wayland; William P. Reidy, Bedford, both of Mass.

[73] Assignee: Visidyne, Inc., Burlington, Mass.

[21] Appl. No.: 191,508

[22] Filed: Sep. 29, 1980

[51] Int. Cl.³ .............................................. G02B 5/10
[52] U.S. Cl. .................................. 350/293; 156/106; 350/294; 378/43
[58] Field of Search ............. 350/293, 294, 310, 230, 350/232; 250/280; 156/99, 102; 264/1.7, 1.9

[56] References Cited

U.S. PATENT DOCUMENTS

| 514,669 | 2/1894 | Allingham | 350/294 |
| 3,801,423 | 4/1974 | Laethem et al. | 156/102 |
| 4,124,277 | 11/1978 | Stang | 350/293 |

*Primary Examiner*—Alfred E. Smith
*Assistant Examiner*—T. N. Grigsby
*Attorney, Agent, or Firm*—Joseph S. Iandiorio

[57] ABSTRACT

A curved glass X-Ray reflector having a curve depth d' including a glass plate having a stiffness $S_1$; a backing plate having a stiffness $S_2$ and a curved surface with curve depth d; and bonding means for joining the glass plate to the curved surface, the resulting curved glass reflector having curve depth d', where d' is equal to d/R and R is the ratio of $(S_1+S_2)/S_2$: and a method of making such a reflector.

6 Claims, 11 Drawing Figures

CURVED GLASS REFLECTOR AND METHOD OF MAKING SAME

FIELD OF INVENTION

This invention relates to an improved curved glass X-ray reflector and a method of making such a reflector.

BACKGROUND OF INVENTION

In certain types of X-ray imaging equipment, such as Kirkpatrick-Baez devices, a number of slightly curved surfaces or plates, typically float glass, are used to focus X-ray radiation incident at low grazing angles, e.g. one or two degrees or less. (Kirkpatrick, P., and A. V. Baez, "Formation of Optical Images by X-rays", *Journal of the Optical Society of America*, Vol. 38, p. 766 (1948)). Such devices are useful as telescopes for X-ray astronomy and in microscopes for viewing plasma emission.

In one application, the plates are curved or bent by applying forces along only the side edges of the plate so that the front and rear edges are clear for passing X-rays. One shortcoming of such an approach is that the plates tend to form a saddle shape because the center area remains relatively flat compared to the edges where the force is applied. Another bending method that has been suggested uses a torsion bar at each of the front and rear ends of the plate. (Underwood, J. H., "Generation of a Parallel X-ray Beam and Its Use for Testing Collimators," Aerospace Corporation Report No. ATR-76(7493)-4.) The bars are rotated to cause the plate to bend. However, to provide the necessary torsional rigidity to insure uniform bending of the plate, the bars appear to require a thickness of two to three times the thickness of the plate and so seriously diminish the volume available for additional plates in applications where space is limited. It has been proposed simply to heat and reform glass plates to provide the necessary curvature, but it has been determined that upon heating the glass develops warps and wrinkles of its own which are often larger than the required curvature.

SUMMARY OF INVENTION

It is therefore an object of this invention to provide an improved, simple and inexpensive, curved, glass reflector and a method of making it.

It is a further object of this invention to provide such a method of making a curved glass reflector and the reflector thereby made which requires no heat and introduces no uncontrolled surface deformation of the glass.

It is a further object of this invention to provide such a reflector which reduces or eliminates "saddle" effects and other distortions.

It is a further object of this invention to provide such a reflector in which the curvature at the leading and trailing edges is more easily controlled.

It is a further object of this invention to provide such a reflector in which the curvature is substantially as desired and little final adjustment is necessary.

It is a further object of this invention to provide such a reflector in which there are no extraneous obstructing members.

It is a further object of this invention to provide such a reflector which is stronger, more rugged, and tends to prevent shattering and dispersion if the glass is overstressed.

The invention results from the realization that a first flat glass plate can be bonded to a second backing plate having a deeper curved surface of depth d to produce a final shallower curved surface whose depth d' is inversely proportional to the ratio R, where $R=(S_1+S_2)/S_2$, $S_1$ is the stiffness of the first plate, and $S_2$ is the stiffness of the second plate, and that the second backing plate can thus be pre-formed to impose any desired shape or curvature on the first plate.

The invention features a curved glass reflector having a curve depth d'. There is a glass plate having a stiffness $S_1$, and a backing plate having a stiffness $S_2$, with a curved surface with curve depth d, combined together by a bonding means for joining the glass plate to the curved surface; the resulting curved glass reflector has a curve depth d' where d' equals d/R and R is the ratio of $(S_1+S_2)/S_2$.

The backing plate may be a curved metal leaf spring or may be a glass plate having a curved surface with a curve depth d. The bonding means is typically epoxy or silicon rubber.

The method of forming the curved glass reflector with a curve depth d' includes forming a backing plate having a stiffness $S_2$ and a curved surface having a curve depth d, bonding to the curved surface a flat glass plate having a stiffness $S_1$, and after bonding permitting the bonded plates to adjust to an equilibrium curved formation in which the curve depth is d' where d' is equal to d/R and R is the ratio of $(S_1+S_2)/S_2$.

DISCLOSURE OF PREFERRED EMBODIMENT

Other objects, features and advantages will occur from the following description of a preferred embodiment and the accompanying drawings, in which.

Figure 1:
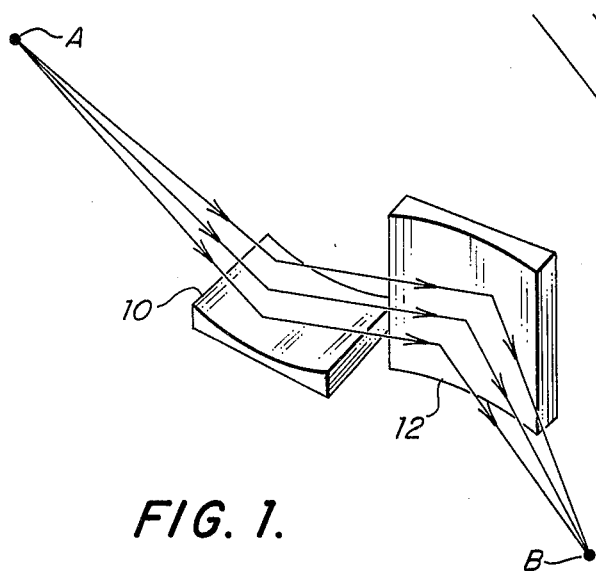
FIG. 1 is an illustrative axonometric view of two glass X-ray reflector plates arranged as a Kirkpatrick-Baez device.

Glass plates may be used in various types of X-ray imaging equipment such as Kirkpatrick-Baez devices, FIG. 1, where X-rays from a source A are reflected at low grazing incidence angles from the curved surface of a first glass plate 10, then to the curved surface of a second glass plate 12, whereupon the X-rays are focused at point B. For proper operation and good resolution of such devices, the surfaces of glass plates 10 and 12 must be properly curved and quite smooth. To obtain the desired degree of smoothness using typical optical working techniques would cost thousands of dollars for each plate.

Figure 2:
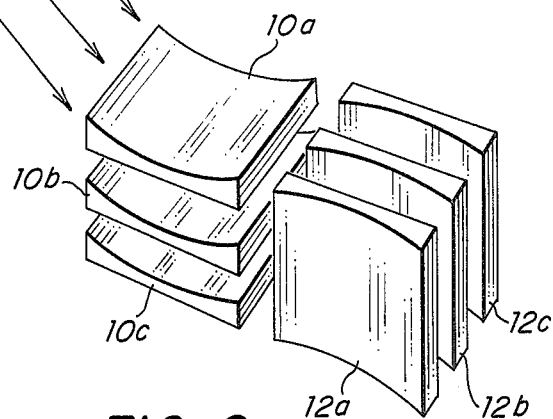
FIG. 2 is a device similar to that shown in FIG. 1 using multiple sets of mirrors.

However, it has been discovered that ordinary glass, that is float glass, made by cooling molten glass on the surface of a molten tin pool, has the required degree of smoothness, and it is quite inexpensive. However, it is required that the glass be curved in some fashion if it is to operate properly in an X-ray imaging device. Presently the techniques used to obtain this curvature are expensive and complex, cause distortion in the plates, and make them quite vulnerable to damage. The cost of this equipment to provide the proper curvature becomes significant when instead of two single plates 10 and 12 the device as in a typical case requires large numbers of such plates acting as mirrors, arranged for example as shown in FIG. 2. In one contemporary proposal the number of plates used is over 100, and the cost of the equipment to impose the proper basic curvature and fine-tune the curvature for sharp focus would be on the order of hundreds of thousands of dollars.

This invention relates to a curved glass reflector which may be used as an X-ray reflector or mirror and to a method of making such a reflector which is relatively inexpensive.

The invention is accomplished by bonding a first flat glass plate to a second backing plate which has a deeper curved surface of depth d to produce a final shallower curved surface whose depth d' is inversely proportional to the ratio R, where $R=(S_1+S_2)/S_2$. $S_1$ is the stiffness of the first plate and $S_2$ is the stiffness of the second plate. The stiffness S of either plate is simply the product of Young's modulus times the cube of the thickness of the plate: $S=Yt^3$. That is, d', the desired depth of curvature of the glass reflector, is inversely proportional to the ratio R: $d'=d/R$.

Figure 3:
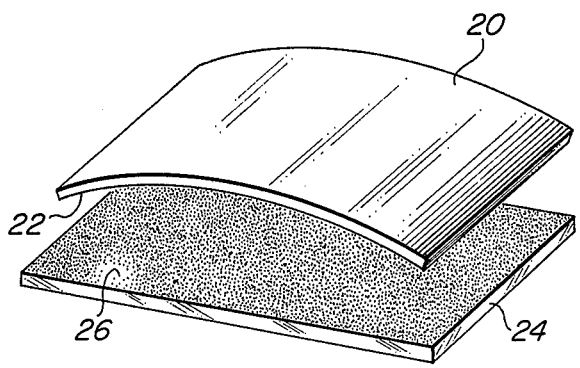
FIG. 3 is an axonometric view of a glass plate and mounting plate prior to bonding.
Figure 4:
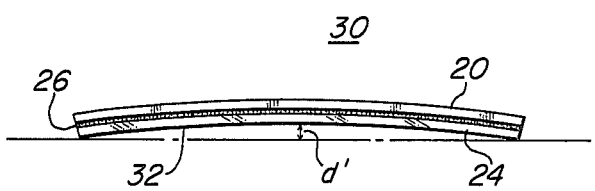
FIG. 4 is a side view of the plates shown in FIG. 3 after bonding.
Figure 5:
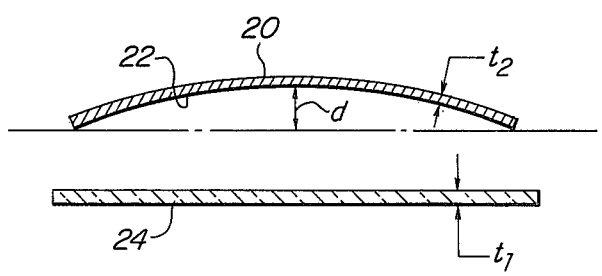
FIG. 5 is a side view of the plates in FIG. 3 showing parameters that are considered to produce the reflector shown in FIG. 4.

There is shown in FIG. 3 a backing plate 20 having a curved surface 22 and a flat float glass plate 24. Bonding means 26, for example an adhesive, is disposed on the surface of glass plate 24. The two plates, approximately twelve inches long, are pressed together and bonded into a single float glass reflector 30, FIG. 4, wherein the surface 32 of the float glass is curved to have a curve depth d'. The desired resulting curve depth d' can be predicted when the initial curve depth d, FIG. 5, of curved surface 22 is known, along with its average thickness $t_2$ and Young's modulus $Y_2$. Also known is the average thickness $t_1$ and Young's modulus $Y_1$ of glass plate 24. Then d' is related to d in inverse proportion to the stiffness ratio R: $d'=d/R$, where R may be calculated as follows:

$$R=(t_1/t_2)^3(Y_1/Y_2)+1 \qquad (1)$$

For example, if $t_1=0.090$ inches, $t_2=0.015$ inches, $Y_1=10^7$ and $Y_2=3\times10^7$ then:

$$R = \left(\frac{.090}{.015}\right)^3 \frac{10^7}{3\times10^7} + 1 \qquad (2)$$

$$R=73 \qquad (3)$$

Thus d' will be smaller, or 1/73, of d: for a resulting depth d' of 0.01 inches, d must be equal to 0.73 inches:

$$d=d'R=0.01\times73=0.73 \text{ inches} \qquad (4)$$

The thermal expansion coefficients of the reflector plate 24 and backing plate 20 should be as closely matched as possible to avoid any bimetallic spring effect which would change the curvature of the reflector 30 with change in temperature. For example, with float glass having a coefficient of thermal expansion of $3.6\times10^{-6}$ in./in.°F., a 47% nickel steel plate having a coefficient of expansion at room temperature of $3.6\times10^{-6}$ in./in.°F. is preferred. Also a resilient adhesive layer which could absorb some strain in shear could be used for the bonding means to reduce the effects of any mismatch of materials.

One inherent advantage of this construction is that any irregularities and inaccuracies in the surface 22 on mounting plate 20 are de-emphasized or demagnified on the final reflecting surface 32 by at least the factor R, and thus with large values of R the tolerances of the mounting plate construction can be somewhat relaxed.

With the construction of this invention, the final curved surface 32 may assume any of a variety of smooth, cylindrical curves including cylindrical parabolas, ellipses, hyperbolas, and arcs of circles, because generally the final curved surface 32 is just the initial curve 22 reduced by a factor R.

Figure 6:
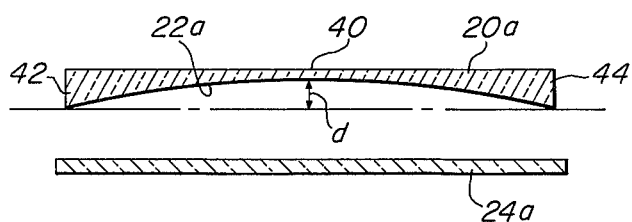
FIG. 6 is a side view similar to FIG. 5 showing an alternative mounting plate construction.
Figure 7:
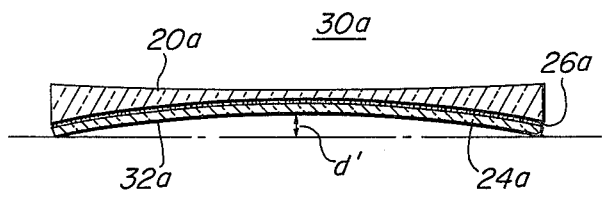
FIG. 7 is a side view of the reflector formed from the bonding of the plates in FIG. 6.

The method according to the invention requires first forming, in a backing plate having a particular selected thickness $t_2$ and stiffness $S_2$, a curve of the desired shape and depth d. Next, the curved surface of the backing plate is bonded to the flat float glass plate of thickness $t_1$ and stiffness $S_1$. The resulting combination is then permitted to adjust to an equilibrium form in which the final curve depth d' is achieved where $d'=d/R$ and R is the ratio of $(S_1+S_2)/S_2$ The problem of matching the coefficient of thermal expansion with the mounting plates and glass plate can be avoided by using a mounting plate 20a made of the same material, glass, as the reflector plate 24a, FIG. 6. In that instance the curved surface 22a may be ground into one side of plate 20a to the depth d. Then, when the plates 20a and 24a are bonded together to form reflector 30a, the resulting reflector curve 32a has the depth d'. Since the plates are of the same material and thus have the same Young's modulus, d' is simply one-half of d, provided that the thicknesses of the two plates are equal. As shown in FIGS. 6 and 7, the center portion 40 of mounting plate 20a is thinner than end portions 42 and 44. This causes the center portion to be less stiff and the ends to be more stiff and the final curve 32a is modified accordingly.

Figure 8:
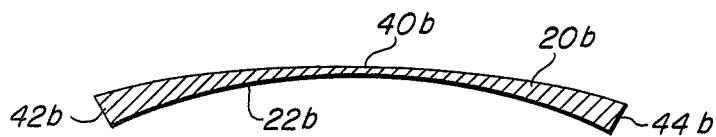
FIG. 8 is a side view of an alternative form of backing plate according to this invention illustrating one way to modify the stiffness characteristics of a backing plate.

A similar thickening of the ends 42b, 44b, or thinning of the central portion 40b, is effected on a metal mounting plate 20b, FIG. 8, for the same reason, that is, to modify the final curvature of the reflector so that it diverges somewhat from the original curve 22b of mounting plate 20b.

Figure 9:
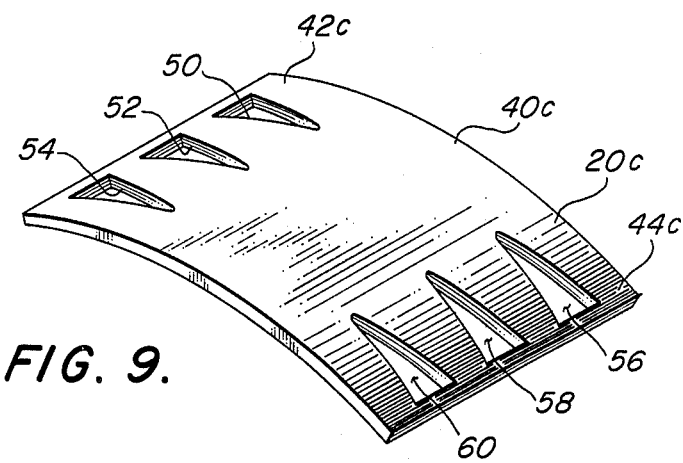
FIG. 9 is a side view of an alternative form of backing plate according to this invention illustrating another way to modify the stiffness characteristics of a backing plate.

In addition to thickening one portion or thinning another, desired modifications may be accomplished by relieving certain portions of mounting plate 20c, FIG. 9, for example by introduction of holes 50, 52, 54, and holes 56, 58, 60, at either end 42c, 44c of mounting plate 20c.

Figure 10:
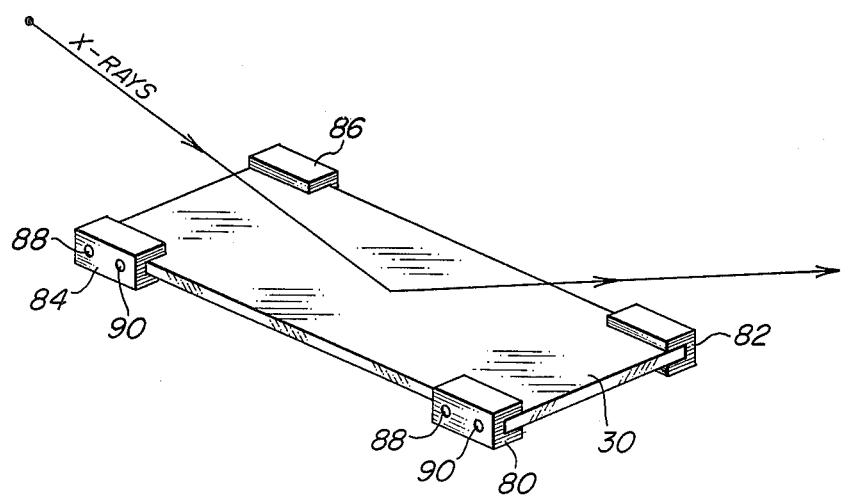
FIG. 10 is an axonometric view of a reflector according to this invention with mounting tracks.
Figure 11:
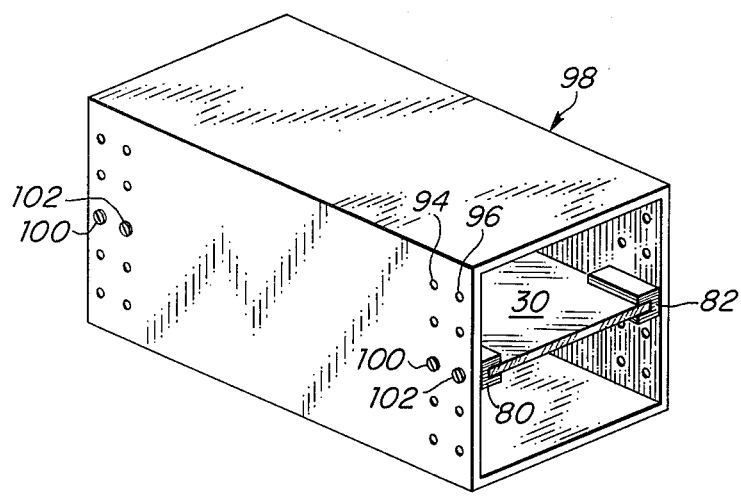
FIG. 11 is an axonometric view of a frame for mounting the reflector of FIG. 10.

Reflector 30 may be provided with means for effecting minor corrections to its curvature. Tracks 80, 82, 84, 86, FIG. 10, mounted at each corner include threaded holes 88, 90, which align with enlarged holes 94, 96, FIG. 11, in frame 98. Reflector 30 is adjusted to the proper curvature and then screws 100, 102 are tightened to fix reflector 30 in place.

Other embodiments will occur to those skilled in the art and are within the following claims:

What is claimed is:

1. A method of forming a curved, glass reflector having a curve depth d' comprising:

forming, in a metal leaf spring backing plate having a stiffness $S_2$, a curved surface having a curve depth d;

bonding to said curved surface a flat glass plate having a stiffness $S_1$; and after bonding, permitting said bonded plates to adjust to an equilibrium curved formation in which the curve depth is d' where d'=d/R and R is the ratio of $(S_1+S_2)/S_2$.

2. A method of forming a curved, glass reflector having a curve depth d' comprising:

forming, in a glass backing plate having a stiffness $S_2$, a curved surface having a curve depth d;

bonding to said curved surface a flat glass plate having a stiffness $S_1$; and after bonding, permitting said bonded plates to adjust to an equilibrium curved formation in which the curve depth is d' where d'=d/R and R is the ratio of $(S_1+S_2)/S_2$.

3. A curved glass reflector having a curve depth d' comprising:

a flat glass plate having a stiffness $S_1$;

a backing plate including a glass plate having a stiffness $S_2$ and a curved surface with an initial curve depth d; and bonding means for joining said glass plate to said curved surface, the joined plates having curve depth d', where d' equals d/R and R is the ratio of $(S_1+S_2)/S_2$.

4. A curved glass reflector having a curve depth d' comprising:

a glass plate having a stiffness $S_1$;

a backing plate including a metal leaf spring having a stiffness $S_2$ and a curved surface with an initial curve depth d; and bonding means for joining said glass plate to said curved surface, the joined plates having curve depth d', where d' equals d/R and R is the ratio of $(S_1+S_2)/S_2$.

5. The curved glass reflector of claim 4 in which said backing plate includes one or more relieved portions.

6. A curved glass reflector having a curve depth d' comprising:

a glass plate having a stiffness $S_1$;

a backing plate having a stiffness $S_2$ and a curved surface with an initial curve depth d;

bonding means for joining said glass plate to said curved surface, the joined plates having curve depth d', where d' equals d/R and R is the ratio of $(S_1+S_2)/S_2$; and track means mounted one proximate each corner of said reflector for adjustably mounting said reflector in a support frame.

* * * * *